United States Patent
O'Donovan et al.

(10) Patent No.: US 9,213,787 B1
(45) Date of Patent: Dec. 15, 2015

(54) SIMULATION BASED SYSTEM AND METHOD FOR GATE OXIDE RELIABILITY ENHANCEMENT

(71) Applicant: Cadence Design Systems, Inc., San Jose, CA (US)

(72) Inventors: Richard J. O'Donovan, San Jose, CA (US); Donald J. O'Riordan, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/231,506

(22) Filed: Mar. 31, 2014

(51) Int. Cl.
*G06F 17/50* (2006.01)

(52) U.S. Cl.
CPC ................... *G06F 17/5009* (2013.01)

(58) Field of Classification Search
CPC ........... G01R 31/2621; G01R 31/3004; G01R 31/31707; G06F 11/261; G06F 17/5036
USPC ................... 716/106, 111, 115, 136
See application file for complete search history.

(56) References Cited

U.S. PATENT DOCUMENTS

| | | | | |
|---|---|---|---|---|
| 5,600,578 | A * | 2/1997 | Fang et al. | 703/14 |
| 5,615,377 | A * | 3/1997 | Shimizu et al. | 703/13 |
| 2003/0033588 | A1* | 2/2003 | Alexander | 717/107 |
| 2010/0088660 | A1* | 4/2010 | Kim et al. | 716/5 |
| 2014/0088947 | A1* | 3/2014 | Anemikos et al. | 703/14 |
| 2014/0229784 | A1* | 8/2014 | Bose et al. | 714/742 |

OTHER PUBLICATIONS

Kim et al., "Modeling Manufacturing Yield and Reliability," IEEE Transactions on Semiconductor Manufacturing, vol. 12. No. 4, Nov. 1999, pp. 485-492.
Simon et al., "Identification of Plasma-Induced Damage Conditions in VLSI Designs," IEEE Transactions on Semiconductor Manufacturing, vol. 13, No. 2, May 2000, pp. 136-144.
Brozek et al., "Charge Injection Using Gate-Induced-Drain-Leakage Current for Characterization of Plasma Edge Damage in CMOS Devices," IEEE Transactions on Semiconductor Manufacturing, vol. 11, No. 2, May 1998, pp. 211-216.
Soden et al. "Test Considerations for Gate Oxide Shorts in CMOS ICs," IEEE Design & Test, vol. 3, Issue 4, Aug. 1986, pp. 56-64.

(Continued)

*Primary Examiner* — Vuthe Siek
(74) *Attorney, Agent, or Firm* — Kenyon & Kenyon LLP

(57) ABSTRACT

A system, method, and computer program product for improving circuit reliability via circuit schematic simulation. A circuit simulator may netlist and simulate a schematic with a reference stimulus and determine whether a circuit component is a candidate for stress analysis, and store candidate component circuit conditions. A stress test simulation may determine if candidate components are stressed by exposure to simulated conditions meeting a stress test criterion, and output information regarding stressed circuit components. Embodiments may simulate analog integrated circuitry, determine MOS component gate oxide layer area according to component length and width, and monitor conditions on components deemed most likely to be defective, including larger MOS components. A circuit simulator plug-in may avoid storing simulation output waveforms or performing layout based analysis. Embodiments may modify the netlist and/or the test stimulus to increase the percentage of stressed circuit components, including bypassing voltage regulators and adding test connections.

20 Claims, 12 Drawing Sheets

(56) References Cited

OTHER PUBLICATIONS

Woods, Murray H., "MOS VLSI Reliability and Yield Trends," Proceedings of the IEEE, vol. 74, No. 12, Dec. 1986, pp. 1715-1731.
Barrette et al., "Evaluation of Early Failure Screening Methods," Int'l. Workshop on IDDQ Testing, IEEE, Oct. 24-25, 1996, pp. 14-17.
Kawahara et al., "The Effectiveness of IDDQ and High Voltage Stress for Burn-in Elimination," Int'l. Workshop on IDDQ Testing, IEEE, Oct. 24-25, 1996, pp. 9-13.
Righter, et al., "CMOS IC Reliability Indicators and Burn-in Economics," Proc. Int'l. Test Conference, IEEE, Oct. 18-23, 1998, p. 194-203.
Chang et al., "SHOrt Voltage Elevation (SHOVE) Test for Weak CMOS IC's," Proc. VLSI Test Symposiums, IEEE, Apr. 27-May 1, 1997, pp. 446-451.
Chang et al., "SHOrt Voltage Elevation (SHOVE) Test," IEEE Int'l. Workshop on IDDQ Testing, Oct. 24, 1996, pp. 45-49.
Khalil et al., "High-Voltage Stress Test Paradigms of Analog CMOS ICs for Gate-Oxide Reliability Enhancement," Int'l. VLSI Test, IEEE, Apr. 30-May 3, 2001, pp. 333-338.
Khalil et al., "Extreme-Voltage Stress Vector Generation of Analog CMOS ICs for Gate-Oxide Reliability Enhancement," Int'l. VLSI Test Conference, IEEE, Sep. 2001, pp. 348-357.
Yim et al., "A Prevenient Voltage Stress Test Method for High Density Memory," 4th IEEE Int'l. Symposium on Electronic Design, Test & Applications, Delta 2008, Jan. 23-25, 2008, pp. 516-520.
Effective Automotive Quality, www.onsemi.com/pub_link/Collateral/TND387-D, Dec. 2009, 47 pages.

* cited by examiner

| Condition | VDD | VIN | VOUT |
|---|---|---|---|
| 1.1V | 1.1V | 0V | 1.1V |
| 1.4V (Stress) | 1.4V | 0V | 1.4V |

| Condition | Uin | Uout |
|---|---|---|
| 6V | 6V | 1.9V |
| 11V (Stress) | 11V | 1.9V |

SIMULATION BASED SYSTEM AND METHOD FOR GATE OXIDE RELIABILITY ENHANCEMENT

BACKGROUND

The present invention relates to the field of circuit simulation, and more precisely to enabling circuit designers to more easily and immediately ensure that predetermined voltages are properly applied to circuit components during simulated stress testing.

Yield and reliability are two factors affecting the profitability of semiconductor manufacturing. Yield refers to the percentage of integrated circuits that perform properly after fabrication, while reliability refers to the likelihood an integrated circuit will fail only after some useful lifetime. Integrated circuit components tend to fail primarily from early "infant mortality" or from later "wear out", with a relatively low failure rate in between. Reduction of early failures is desirable to improve integrated circuit reliability.

One way to reduce early failures is to apply "stress" testing to speed up the deterioration of electronic devices with latent defects. The concept is to effectively accelerate through the early life of such devices while they are still in the factory. Integrated circuits that would normally succumb to infant mortality after sale are instead made to fail more quickly, so they may be screened (e.g., identified and discarded) prior to shipment. The integrated circuits that pass the stress testing process may begin their operation with a failure rate much lower than that typical of unscreened newly manufactured integrated circuits.

The industry standard methods for such screening have included "burn in" and high voltage screening. Burn in may subject new integrated circuits to operation at elevated temperatures, typically for days. Burn in is effective to varying degrees for almost all circuits and the many physical mechanisms underlying premature failure. This screening option is relatively costly however, with added manufacturing costs typically ranging from five percent to forty percent of the total product cost, depending on the burn in time, integrated circuit quality, and product complexity.

High voltage screening, often referred to as extreme voltage screening or voltage stress testing, aims to similarly improve integrated circuit quality without requiring the higher cost burn in process. Voltage stress testing may comprise the application of significantly higher supply and input voltages than normal to a circuit, typically for a few seconds during routine production functionality testing, to activate latent defects. Voltage stresses may be applied in dynamic pulse patterns that are most likely to activate defects.

Engineers have used voltage stress testing to enhance the reliability of digital integrated circuits. More recently, engineers have also applied voltage stress testing to analog integrated circuits, though with some difficulty. Applying stress test voltages to the external pins of analog integrated circuits does not necessarily cause the internal devices to be subjected to desired overvoltages. On-chip voltage regulators may prevent the externally applied stress voltages from propagating to desired internal nodes because they regulate the desired stress voltages back down to normal non-stress levels.

Accordingly, the inventors have developed a solution to address this problem.

DETAILED DESCRIPTION

This description of the present invention presents a new system, method, and computer program product for improving circuit reliability via circuit schematic simulation. Given a circuit schematic and a reference stimulus, embodiments may generate a reference netlist and perform a reference simulation. During the reference simulation, embodiments may determine whether at least one circuit component is a candidate for stress analysis. Candidate components may comprise devices with large gate oxide areas. Candidate component circuit conditions may be determined and stored. Then, given a circuit schematic and a stress stimulus, embodiments may generate a stress test netlist and perform a stress test simulation. During the stress test simulation, embodiments may determine whether selected candidate components are stressed by exposure to simulated conditions meeting a stress test criterion, and may output simulation results that may also include a list of and/or a percentage of stressed circuit components.

Embodiments may simulate analog integrated circuitry, determine MOS component gate oxide layer area according to component length and width, and monitor conditions on components deemed most likely to be defective, including larger gate oxide area MOS components. A circuit simulator (extended via a plug-in) may avoid storing simulation output waveforms and performing layout based analysis. Embodiments may modify the netlist and/or the test stimulus to increase the percentage of stressed circuit components, including bypassing voltage regulators and adding test connections.

Figure 1:
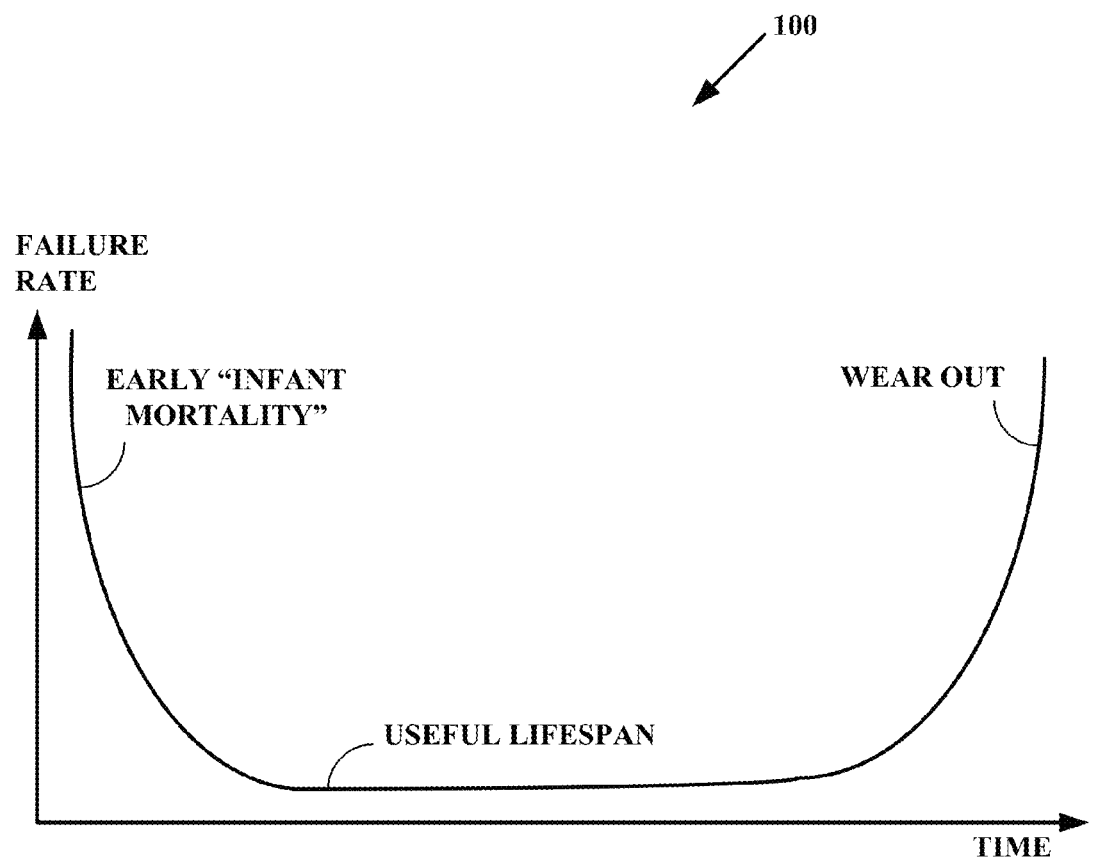
FIG. 1 is a diagram of failure rate versus time, according to an embodiment.

FIG. 1 shows failure rate versus time, according to an embodiment. This diagram 100 is known as a "bathtub curve" due to its overall shape, with high failure rates at the beginning and end of new product lifetimes. With no stress testing done to accelerate the failure of newly manufactured devices with latent defects, there is a significant period in which infant mortality may occur in the lifetime of a device or circuit. Thereafter, a useful lifespan with relatively low failure rates allows reliable circuit operation. At some point however, a variety of reliability related physical phenomena will cause an increase in failure rates as the devices comprising the circuits wear out.

Figure 2:
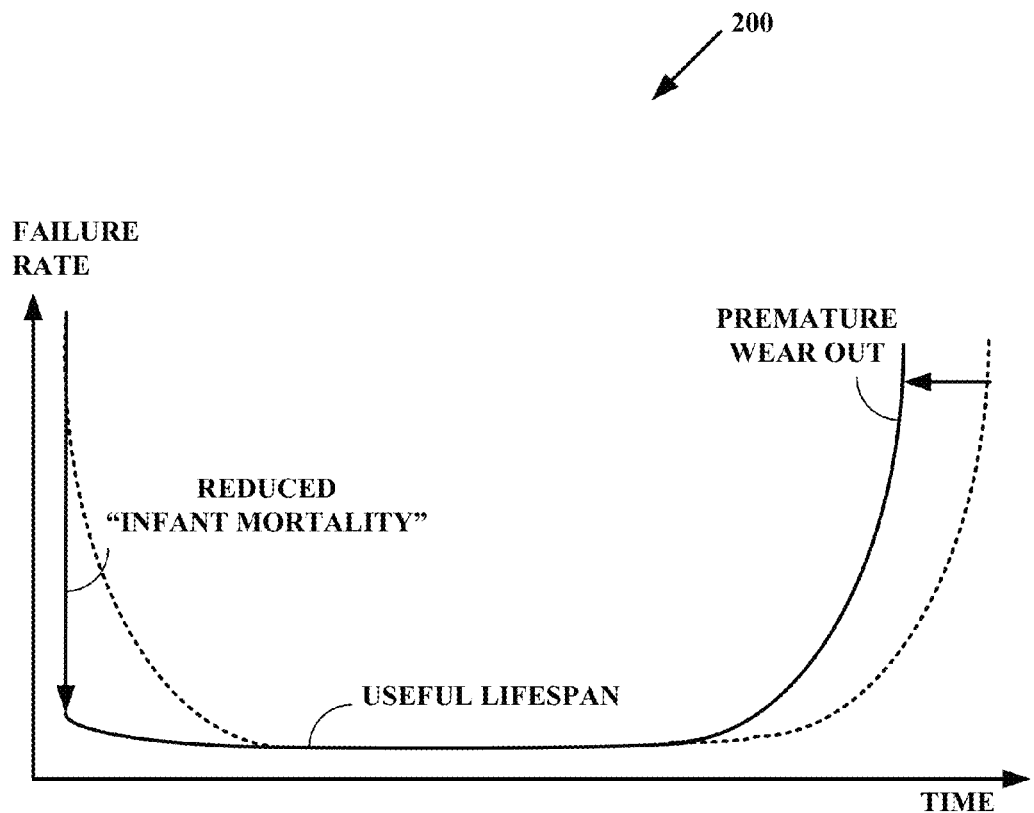
FIG. 2 is a diagram of the possible effects of stress testing on failure rate, according to an embodiment.

FIG. 2 shows the possible effects of stress testing on failure rate, according to an embodiment. Stress testing is intended to greatly reduce the early failures of components that survive the testing, without adversely affecting their useful lifetimes.

After stress testing, the subsequent time required for devices with latent defects to fail may be sharply reduced, ideally to zero, so that failure rates among surviving devices may be greatly decreased as shown in post-test curve 200. Premature wear out may occur however, reducing the useful component lifespan for example if stress testing exposes components to excessive voltage for too long.

In this description, the focus is on voltage stress testing versus other stress testing schemes, but embodiments may be configured for any stress testing scheme that may be simulated. Voltage stress testing is commonly used for dynamic random access memories and for safety critical automotive components. Voltage stress testing may routinely improve initial failure rates by a factor of ten, yet if properly implemented does not cause surviving integrated circuits to undergo significant lifetime reduction. An aging limitation is often set as part of a design for manufacture specification, to cap premature wear out so that no more than a small percentage reduction, e.g., one percent, in predicted integrated circuit lifespan occurs.

Figure 3:
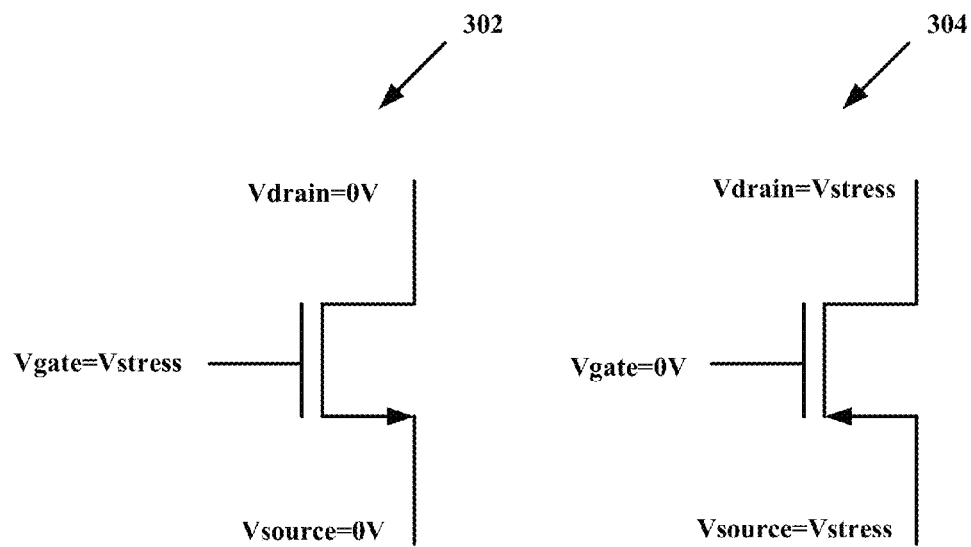
FIG. 3 is a diagram of voltage stress criteria for different types of devices, according to an embodiment.

FIG. 3 shows voltage stress criteria for different types of devices, according to an embodiment. For an NMOS device 302, the stress test criterion may be to apply a specified stress voltage Vstress to the gate, while the source and drain for example are at zero volts. Similarly, for a PMOS device 304, the stress test criterion may be to apply zero volts to the gate while the source and drain for example are at Vstress volts. Devices tested to the point where stress test criteria are met are deemed sufficiently stressed to adequately accelerate the failure of defective devices.

Figure 4A:
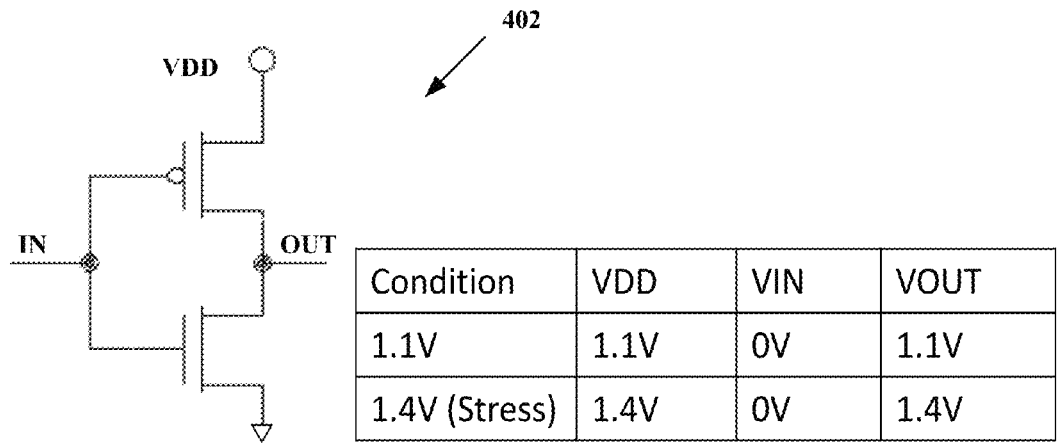
FIGS. 4A-4B are diagrams of voltage stress testing on digital and analog circuits, according to an embodiment.
Figure 4B:
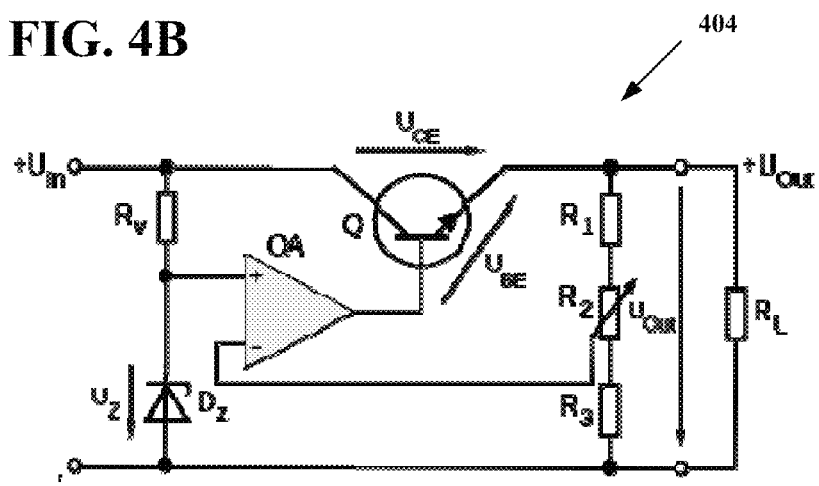

FIGS. 4A-4B show voltage stress testing on digital (FIG. 4A) and analog (FIG. 4B) circuits, according to an embodiment. In digital circuits such as logic inverter 402, increasing the supply voltage as a test stimulus is often sufficient to ensure that all components of concern are exposed to the desired voltage stress during one logic state or another. For example, if supply voltage $V_{DD}$ is normally 1.1V, it may be pushed to 1.4V during voltage stress testing and the stress voltage propagates throughout the integrated circuit, reaching most if not all devices as desired.

Ensuring stress exposure for devices may be more difficult for analog integrated circuits. For example, if supply voltage $U_{in}$ is normally 6V, it may be pushed to 11V during stress testing, but that may not guarantee that all the devices (e.g., $R_L$) in the analog circuit are subjected to the desired stress, e.g., as node $U_{out}$ stays fixed at 1.9V. Voltage regulators like 404 may be present on the integrated circuit, and may act to prevent the stress voltage from being applied to all the integrated circuit devices.

Fixed testing plans based merely on boosted supply voltages and input voltages may therefore prove inadequate for analog circuits. Analog integrated circuits may require detailed simulation to plan a stress test, to ensure that proper overvoltages or other stress test conditions are applied to all devices to be stressed, and optionally for a required duration, to meet a stress test criterion. It may not be desirable to stress all devices in a circuit, but to instead target only a selected subset known to be more vulnerable. Stressing only selected devices may help prevent premature circuit wear out. Further, it may not be possible to stress all selected devices during a simulation, because for example it may simply be too burdensome to arrange all the design changes needed.

Figure 5:
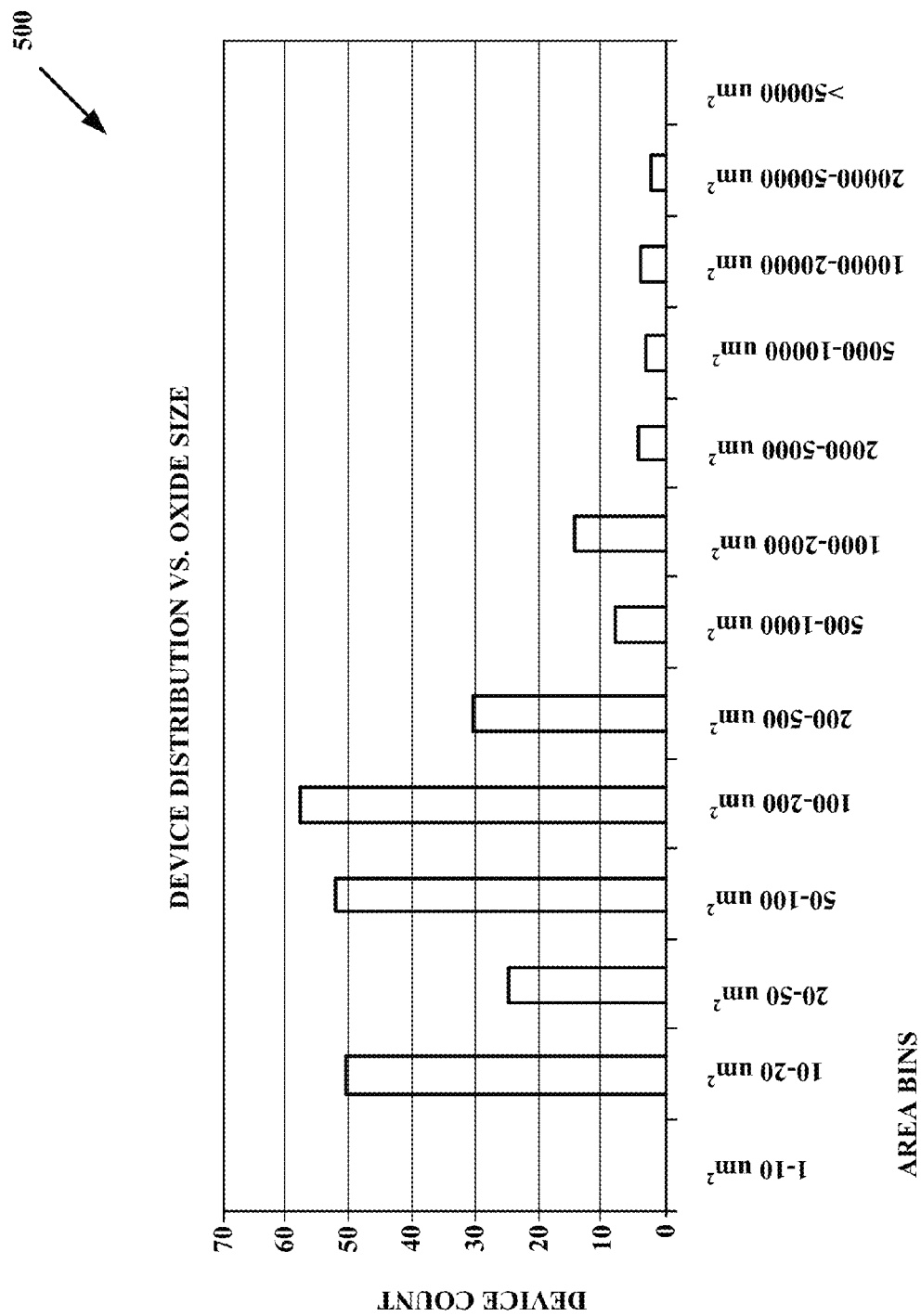
FIG. 5 is a diagram of a distribution of devices versus gate oxide area, according to an embodiment.

FIG. 5 shows a distribution of devices in a circuit versus gate oxide area, according to an embodiment. Gate oxide dielectric breakdown is one major cause for reliability problems in MOS integrated circuits. MOS transistors and capacitors are formed with thin layers of silicon dioxide or other electrically insulating materials. Plasma is often used to deposit or remove materials in modern semiconductor manufacturing, and may cause destructive charge levels to build up on gate oxide layers. If the charge build up is large enough, and the charge has no other leakage path to the substrate, a current will flow through discharge paths in the gate oxide layer, causing damage. The damaged gate oxide may degrade the device performance and increase early circuit failures.

Transistors and capacitors having larger areas of gate oxide may be proportionally more susceptible to such failures. In many analog circuit designs there may be many small devices with small gate oxide areas, and only a few large devices with relatively large gate oxide areas as shown in 500. In one example design, only fifteen percent of the devices contributed to over seventy percent of the gate oxide area. Thus, in one embodiment, those larger devices may be selected as primary targets for voltage stress testing, to ensure that a larger percentage of the total gate oxide area of an integrated circuit will be covered.

Modern integrated circuit design nearly invariably involves the use of software design tools to manage essentially all aspects of the design process. Some design tools exist to address manufacturability and testing issues from a given integrated circuit layout, e.g., after a design has been created and simulated. Layout based attempts to identify the candidate devices to target for stress testing have been proposed, but are expensive because they involve multilayer extraction or shape querying to identify the gate oxide areas under MOS devices. Further, managing the mapping of information between a layout database and a simulator name space is complicated. Correlating extracted layout device names in a layout database namespace to analog simulation results in the simulator namespace to determine the coverage involves extra complexity, making the solution error prone.

Additionally, performing stress testing simulation prior to integrated circuit layout generation is advantageous because the design may still be in the process of being created or modified. The results of stress simulations may drive stress related design changes, for example to increase the stress test coverage. Circuit designers may for example decide to add test connections, or modify supply voltages or input voltages or other test stimuli or their durations to meet a stress test criterion. Designers may also modify their circuit designs to ensure that devices that are normally protected from voltage stress by a voltage regulator are not so protected during stress testing. Schematic changes are generally far simpler to implement in a design cycle than corresponding layout changes.

A schematic based approach may also avoid many problems associated with computing gate oxide area from a layout. Attempts to analyze circuit schematics instead of layouts to determine the highest gate oxide area devices are however currently prone to certain difficulties. For example, schematic device areas, widths, and lengths are often provided by circuit designers in various expression formats, and such expressions may need to be evaluated to determine the resulting area. Such expression evaluation may involve a hierarchical traversal of the full circuit design and may additionally require testbench information, e.g., design variables, not stored solely within the schematic. Hence, a simple inspection of a schematic cellview alone is often insufficient.

A simulator itself may calculate gate oxide areas of various transistors and capacitors from a netlisted circuit schematic however. With existing solutions though, user interaction with a simulator after netlist parsing and geometric expression evaluation but prior to simulation is limited, if available at all. Communication and interaction limitations between the circuit designer and the circuit simulator therefore limit performance for many important design tasks, including stress testing.

Circuit designers thus need design tools that more flexibly address two basic stress testing issues. First, to identify the best candidate components in a given design to be targeted for stress testing. Second, to determine the actual coverage, e.g., the percentage of targeted components that were successfully exposed to a stress condition in any given simulation.

A new simulation based approach is therefore now provided to aid in the identification of device candidates and subsequent coverage for voltage stress testing. A modified (via plug-in) simulation tool and its accompanying extensible class library address both tasks. Further, the simulation tool does so in an object oriented manner, wherein users may subclass the supplied base class library to implement customized device stress definitions.

Figure 6:
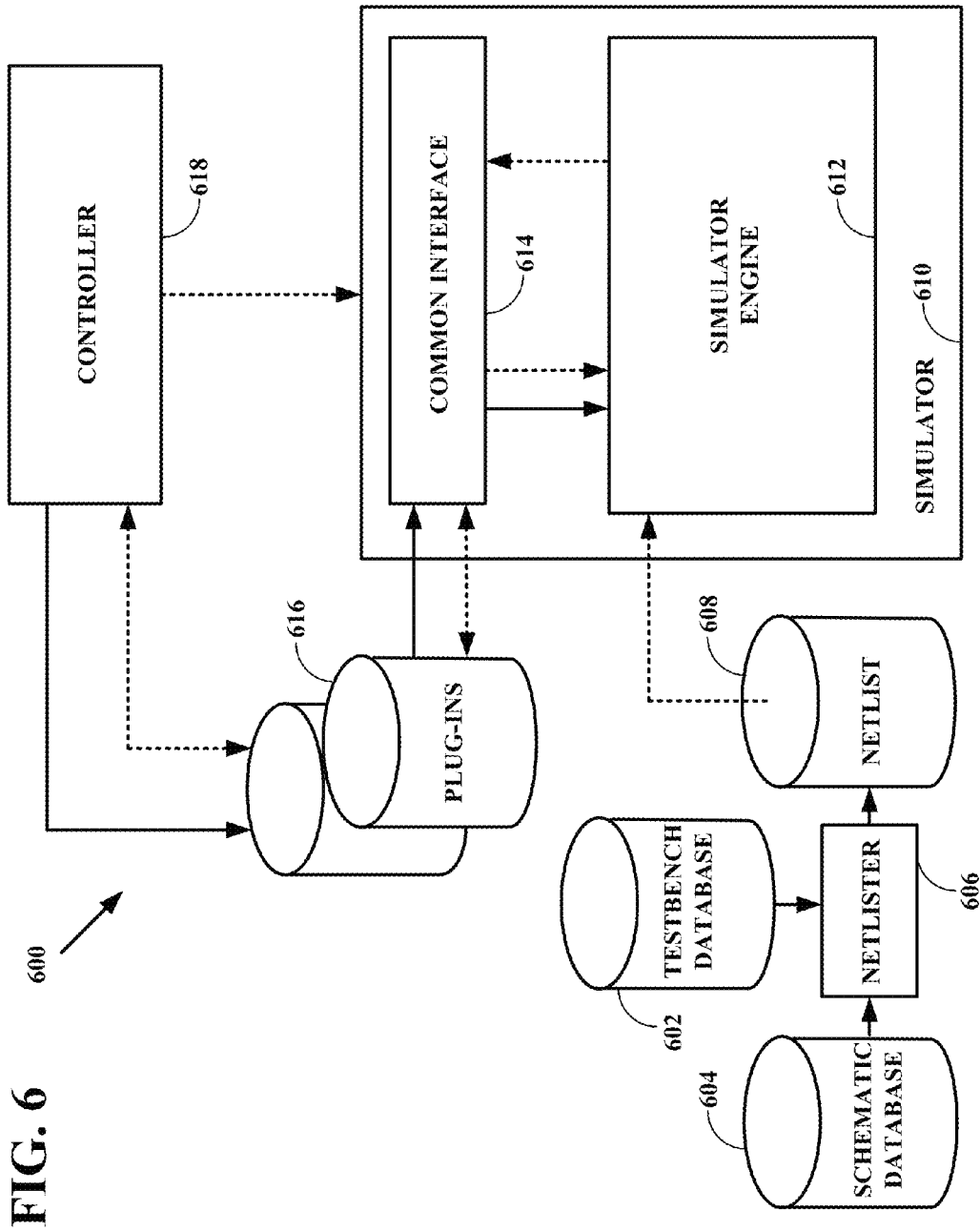
FIG. 6 is a diagram of a stress simulation system, according to an embodiment.

FIG. 6 shows a stress simulation system, according to an embodiment. Stress simulation system 600 may comprise a testbench database 602 and a schematic database 604 that deliver files to a netlister 606 that generates an input netlist 608. Netlister 606 generally converts one or more testbenches and a schematic typically in a graphical format into a textual netlist format that the simulator can process. In one embodiment, simulator 610 may be a SPICE type simulator. When expanded, input netlist 608 may define a full circuit schematic with all device instances and interconnections. Simulator 610 may comprise a simulation engine 612, and a circuit simulator common interface 614 that enables simulator control and data access. Circuit simulator plug-ins 616 may extend simulator 610 to enable it to provide node voltages, branch currents, evaluated device geometries, and other information from simulator engine 612 to a controller 618 during simulation, via the circuit simulator common interface 614. Simulator 610 may be enhanced with a dedicated stress related simulator plug-in 616.

Circuit simulator common interface 614 may enable simulator plug-ins 616 to communicate with controller 618 using shared memory or inter-process communication methods. Interface 614 also enables passive simulation monitoring, active simulation control, design management and modification, and scripting capabilities. Simulator plug-ins 616 may also function as controller 618. For example, another program may invoke simulator 610 and then delegate control to a simulator plug-in 616. Thus, system 600 may increase the flexibility and ease of use of simulation for a variety of tasks, including stress testing.

The system may estimate the gate oxide area for a given device as the product of an effective device width and an effective device length. Simulators normally evaluate the effective device widths and lengths during internal construction of a complete simulatable model from a netlist, so the plug-in modified simulator approach avoids any need to redundantly externally parse and evaluate schematic or testbench based geometry expressions.

The system may then identify the candidate devices to be stress tested given a netlist containing a reference design. The system may identify these candidate devices according to their gate oxide areas, as devices having larger gate oxide areas may be proportionally more susceptible to early failure. The system may generate a Pareto chart or other chart that may show the sorted relative gate oxide areas of a range of different devices in a circuit. In one embodiment, the simulator may enable a circuit designer to select candidate devices by gate oxide area information provided in such a chart. In another embodiment, the simulator may select the largest devices by gate oxide area as candidates, so that a specified minimum cumulative gate oxide area threshold percentage is encompassed by the candidates.

For each candidate device, the system may also dynamically construct observers that remember only candidate device maximum operating point excursion values and maximum node voltages from functional and/or reference tests using a pure functional testbench. (In software engineering, a design "pattern" is a general reusable solution to a commonly occurring software design problem. In an "observer" pattern, an object maintains a list of its dependents, called observers, and notifies them automatically of any state changes.) The observed values may later be recalled by the system as reference conditions when performing stress testbench simulations, to identify candidate devices undergoing an actual stress condition. The system may identify the actual stress coverage of the candidate devices from stress tests, for example by using a separate stress testbench in which for example voltage regulator bypass circuitry may be activated using a pre-supplied stress criterion definition.

In one stress criterion definition, a simulator embodiment may look for stress conditions defined as overvoltages. These overvoltages may be stress testbench candidate device voltages (e.g., Vgs and Vgd) that exceed the remembered corresponding reference simulation maximum excursions by device-type-specific thresholds. In a second definition, the system may identify stress conditions by looking for particular node voltage patterns on the drain, gate, and source terminals of the candidate devices as previously described, within some programmable tolerances. In this latter approach, comparison with reference test results may not be required.

Simulator 610 may be additionally enhanced to provide an extensible object oriented solution to the problem of identifying both the candidate and actual stressed devices during simulation, e.g., dynamically identifying when a particular device is experiencing the stress condition. In one embodiment, simulator 610 may be extended with a scripting language (e.g., Python) and a visitor pattern approach that provides scripting access to the design hierarchy and to the circuit node voltages during simulation. (In object oriented programming parlance, a "visitor" pattern is a known way of separating an algorithm from an object structure on which it operates. The result is the ability to add new operations to existing object structures without modifying those structures). The design hierarchy includes device area related geometry parameters, and the circuit node voltages may include device operating point values Vgs and Vgd.

A base class library may be provided with simulator 610 that provides visitor pattern functions to identify candidate devices for stress testing in a reference (or stress) simulation, in addition to pre-written simulation callback/observer functions for identifying stressed devices during stress testbench simulation. These classes thus may come pre-supplied with the stress condition identification functions defined above, and may be further sub-classed to enable the stress condition identification functions to be modified or extended by users. This feature may allow users to provide custom definitions of stress criteria or related device conditions, for example for other types of stress testing.

The system may output simulation results that may also include various reports listing the candidate devices in the reference simulation, and their gate oxide areas. The reports may also provide the theoretical gate oxide area coverage, and the actual stressed devices and area coverage from the stress testbench simulations for any given stress test stimulus. Different stress test functions and testbenches may be evaluated and compared for stress coverage and efficiency by running different stress testbenches.

The schematic simulation based stress testing solution described may thus advantageously identify candidate devices without the difficulties encountered via other approaches. Known difficulties relating to parsing device area expressions, geometric shape querying, and layout vs. schematic namespace mapping may be avoided. The system may also advantageously avoid the need to track output results for every device by instead monitoring only selected candidate devices. In one embodiment, the simulator 610 may traverse the flattened simulation-ready representation of the design and the system may sort the resulting devices by gate oxide area, and select as candidates a subset of those larger devices that accumulate to some given percentage of the total gate oxide area.

Further, by taking a dynamically generated callback based approach to observing device node values and operating conditions, lightweight observers may be dynamically created only for the most relevant candidate devices. The observers may dynamically identify stress conditions occurring during simulations without the need to save any voluminous waveforms to disk for expensive post-processing.

Identification of Candidate Devices for Stress Testing

In one embodiment, simulator Python classes and methods are provided that implement a visitor pattern. (In object oriented programming parlance, a "method" is a named block of statements that may be invoked elsewhere in a program, similar to a function, but that is associated with an object and has access to the object's data.) After parsing the netlist but before running any analyses, the action method (the main workhorse) of the visitor class may be invoked for each leaf level device in the design hierarchy. This method inspects each leaf level device, first determining if the device is of the correct type, e.g., a MOS device that has a gate oxide, and for which a gate area may be determined.

In one embodiment, a technology file listing all the names of the corresponding device type SPICE models may be supplied to simulator 610. The action method of the visitor may first determine the device master for each such device, and from that determine the SPICE model name, and compare that name to a hardcoded list and/or a list constructed by reading the supplied technology file to determine if the device is of the appropriate type. Subclasses written by users may override this class method. If the device is of the correct type, its effective width and effective length values may be queried directly from the simulator data structures, and its effective gate oxide area may be calculated from the product of width and length values.

A data structure may maintain the gate oxide area for each identified device. After all devices have been accounted for (e.g., the complete hierarchy has been visited), plug-in 616 may compute the total gate oxide area by summing the areas of the individual devices. The plug-in may then sort devices by area, and traverse the sorted list of devices until some pre-specified percentage of the total device area is accounted for. Since it is quite common in analog circuits for a relatively small number of devices to consume a large portion of the overall chip area, only a fairly small percentage of the total number of devices may need to be selected as target devices to be stressed.

After plug-in 616 has inspected and categorized all devices as to their target candidacy, it may write the particular devices tagged as candidate devices (e.g., those contributing the maximum gate oxide areas) to a report, along with their names, master names (device types), and device areas.

Figure 7A:
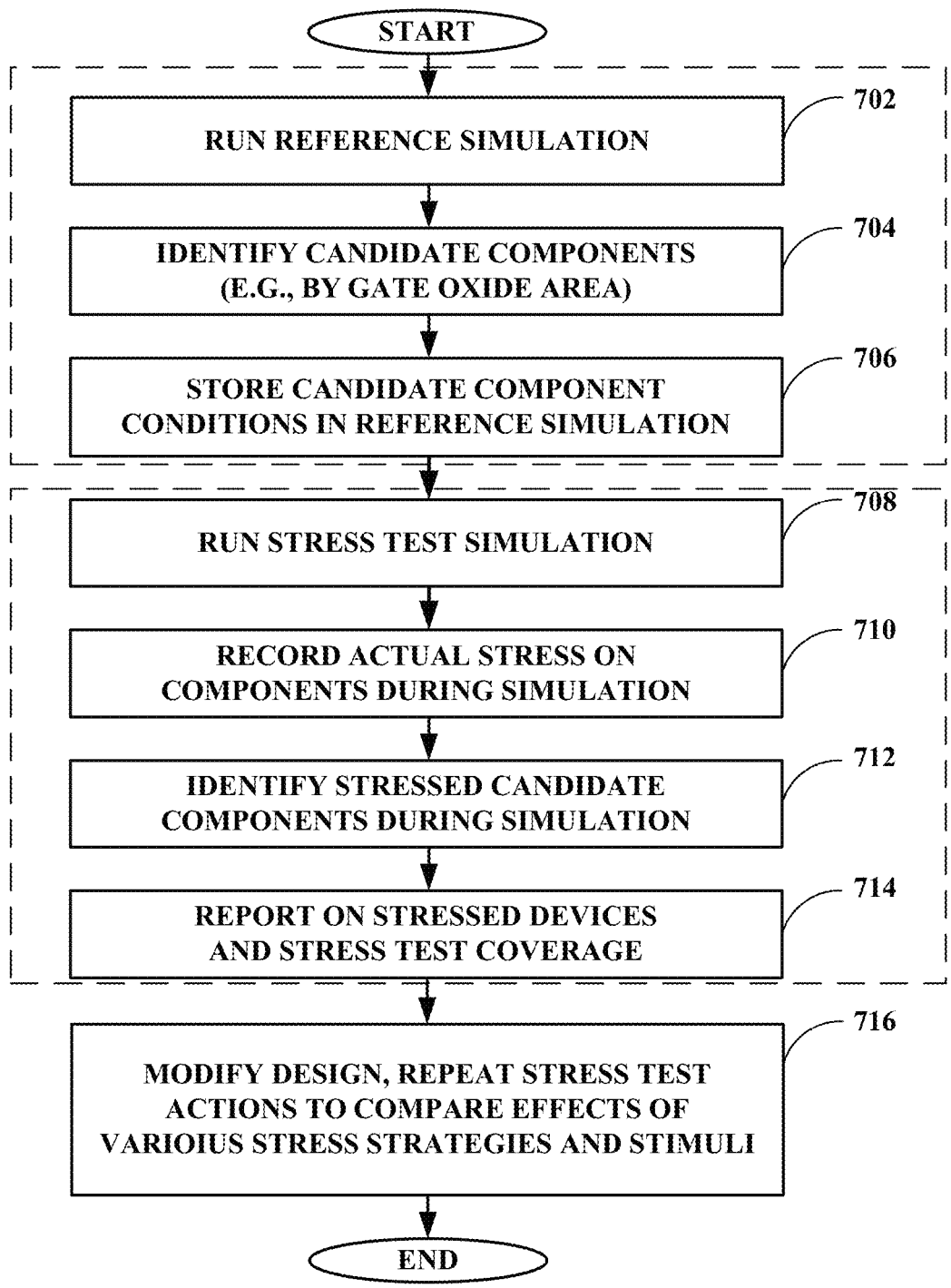
FIGS. 7A-7C are flowcharts of a voltage stress testing coverage determination and maximization method, according to an embodiment.

FIG. 7A shows a flowchart of a voltage stress testing coverage determination and maximization method, according to an embodiment. This overview is described in further detail in FIGS. 7B and 7C, to be described. This embodiment may comprise a transformative algorithm that may be carried out by a particular processor. At 702, the processor may run a reference (e.g., non-stressed) simulation. At 704, the processor may identify candidate components that may be susceptible to stress and thus warrant further simulation scrutiny under stress test conditions. In one example, the identifying may comprise determining the gate oxide area of the devices, sorting the devices by decreasing gate oxide area, and selecting enough of the larger devices as candidates to encompass a predetermined or specified percentage of the total gate oxide area. At 706, the processor may store reference simulation conditions for the identified candidate components. In one example, the processor may store the device condition ranges that occur, thus avoiding the need to store and process voluminous output waveforms. The actions 702-704 may be summarized as the first of two major parts of the method in a broad overview, to be described further in FIG. 7B. The reference simulation is optional, and used only if needed to obtain reference values used later as part of a stress test criterion.

Next, at 708 the processor may run at least one stress test simulation. At 710, the embodiment may identify stressed candidate components during simulation, by comparing dynamically calculated simulation values with predetermined stress test criteria to determine which components have been subjected to conditions deemed likely to accelerate defective component failure. The embodiment may do so without any need to save waveforms to a waveform database. At 714, the embodiment may tangibly output simulation results that may also include at least one report describing the results of stress testing. The report may list identified candidate components, and their gate oxide areas or other criteria used to determine their selection for stress testing. The report may also list when candidate components were stressed, and a percentage of candidate devices that were covered (e.g., exposed to simulated stress conditions). The actions 708-714 may be summarized as the second of two major parts of the method in a broad overview, to be described further in FIG. 7C.

At 716, the embodiment may further comprise modifying the circuit design, and repeating the stress test actions of 708-714 described above. Multiple testbenches may perform different stress test simulations, for example to compare the effects of various stress strategies and applied stimuli. An objective of the repeated stress tests may be to maximize the coverage of components exposed to simulated stress conditions, which may involve design modifications to bypass voltage regulators for example.

Figure 7B:
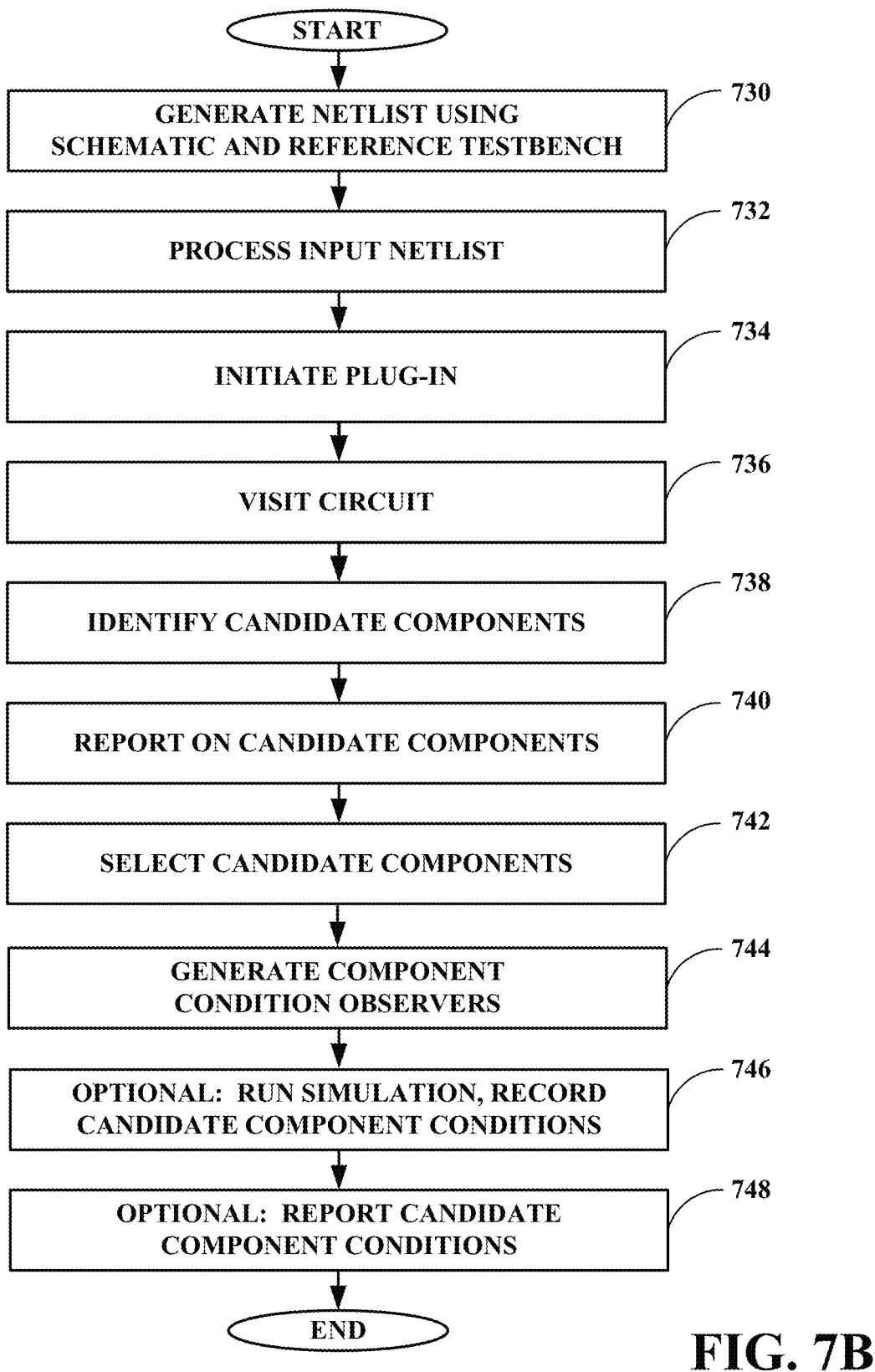

Referring now to FIG. 7B, more detail is shown of the reference simulation, candidate component identification, and storage of reference conditions described above. At 730, the embodiment may generate a netlist (e.g., netlist 608) using a schematic and a reference testbench (which for example, may be provided from schematic database 604 and testbench 602, respectively). At 732, the embodiment may process the input netlist generated, for example with simulator 610. At 734, the embodiment may initiate a plug-in (e.g., plug-in 616). At 736, the embodiment may visit the circuit (e.g., using common interface 614), and at 738 identify candidate components that may be particularly vulnerable to stress testing. At 740, the embodiment may report on the candidate components, and at 742 may select a group of candidate components that may be monitored during later stress testing. At 744, the embodiment may generate component condition observers. At 746, the embodiment may optionally run the reference simulation, recording candidate component conditions. At 748, the embodiment may optionally report out candidate component conditions.

Figure 7C:
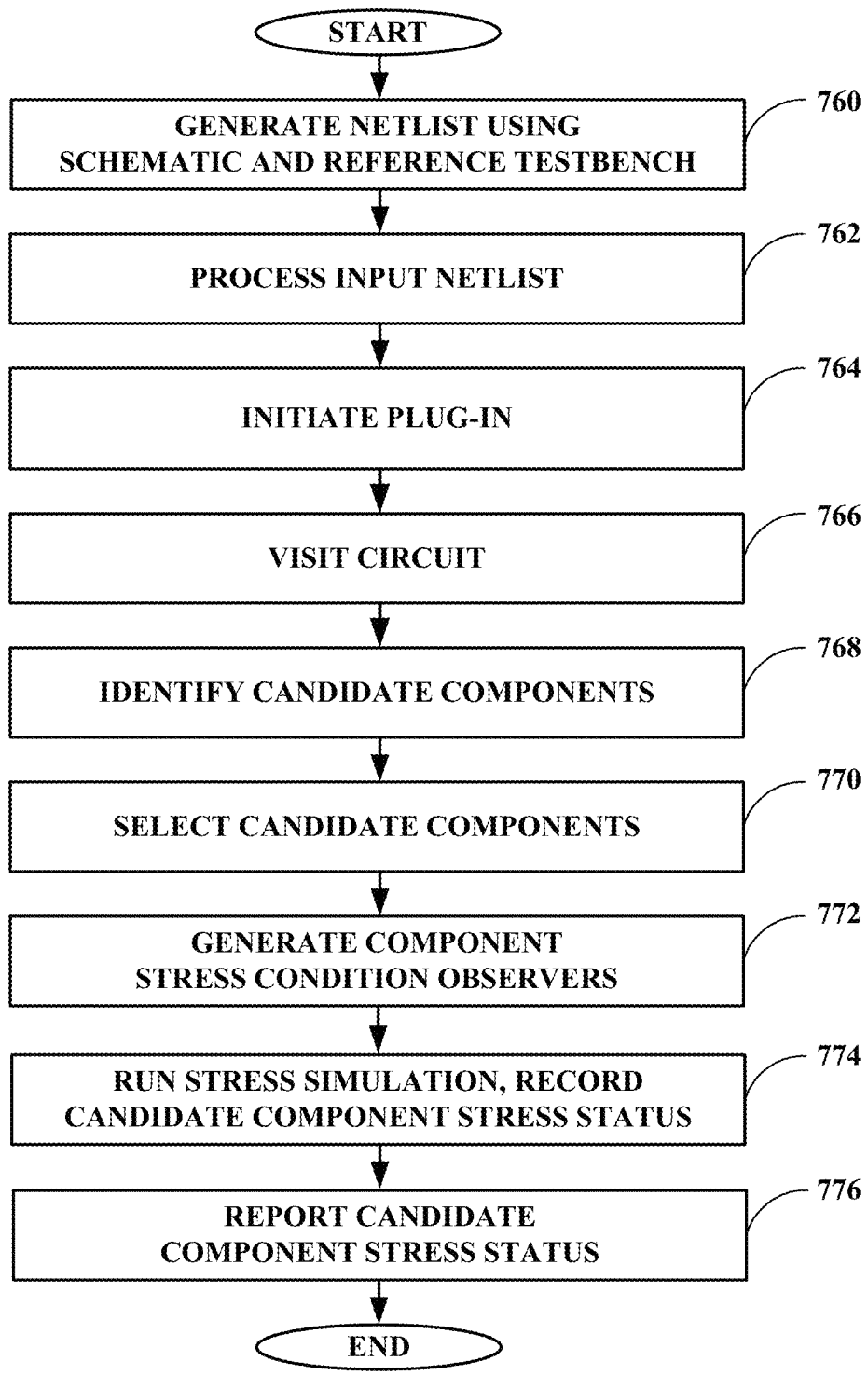

Referring now to FIG. 7C, more detail is shown of the stress simulation and the recording and reporting of selected candidate component actual stress status as described above. At 760, the embodiment may generate a netlist (e.g., netlist 608) using a schematic and a stress testbench (which for example, may be provided from schematic database 604 and testbench 602, respectively). At 762, the embodiment may process the input netlist generated, for example with simulator 610. At 764, the embodiment may initiate a plug-in (e.g., plug-in 616). At 766, the embodiment may visit the circuit (e.g., using common interface 614), and at 768 identify candidate components that may be particularly vulnerable to stress testing. At 770, the embodiment may select candidate components to be monitored during stress testing. At 772, the embodiment may generate component condition observers for the stress testing. At 774, the embodiment may run at least one stress test simulation and record candidate component stress status. Multiple testbenches may perform different stress test simulations. At 776, the embodiment may tangibly report out candidate component stress status.

Identification of Reference Voltages and Operating Points

Figure 8:
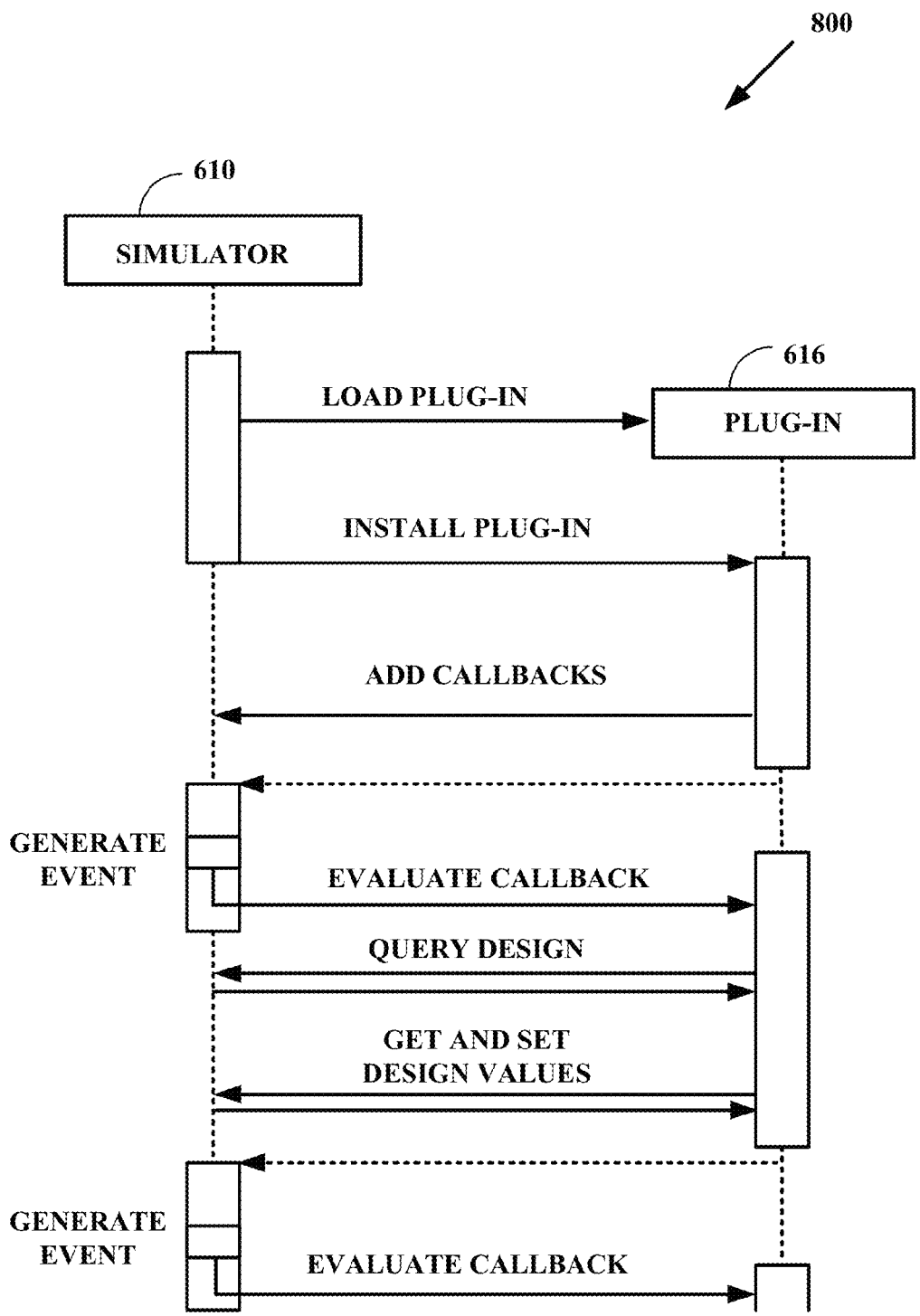
FIG. 8 is a diagram of interactions between a circuit simulator and a plug-in, according to an embodiment.

FIG. 8 shows interactions between a circuit simulator and a plug-in, according to an embodiment. During a reference analysis, which may be run with a reference testbench, plug-in 616 may generate an observer class instance for each of the identified candidate devices. This class may provide callback methods that simulator 610 may call during each simulation solution point, once for each candidate device. From within the callback, which simulator 610 may call for each simulation event when the analysis is run, plug-in 616 may query the device instance for its terminal connectivity, and may access the node voltages for each of the connected candidate drain, gate, and source terminal nodes. The plug-in may also access Vgs and Vgd operating point parameters directly from the device model, and may store the maximum value of each of these in memory and/or to disk.

Identification of Stressed Devices

The plug-in 616 may then exchange the reference testbench for the stress testbench, in which stress voltage vectors may be applied to the same device under test, and another set of observers may be dynamically generated for the candidate devices. These observers may now monitor the device nodes at each simulation time point, to determine if the device is considered adequately stressed. When determining if the stress criterion has been met, a method of the observer class may be called that is expected to return true or false based on current and/or past history of the device terminal voltages and operating point values. In a base class implementation, plug-in 616 may compare the actual values obtained during the stress test with the values remembered (and/or previously stored to disk) from the reference test run. If the values using the stress testbench are found to exceed the reference testbench values by some device specific thresholds, the device may be considered stressed. In an alternate implementation, plug-in 616 may inspect the terminal voltages to see if a predetermined stress voltage condition is applied.

During this inspection, the plug-in 616 may compare the actual voltages to the desired voltages, within some programmable tolerance value to account for nonidealities in the simulation solution, with the reference testbench values being ignored. If at any time during the simulation the plug-in finds the device to be exposed to simulated conditions meeting the device's stress criterion, it may be considered stressed and marked accordingly.

In one embodiment, since an object-oriented scripted implementation is provided, user code may subclass the provided classes to allow users their own observer methods and/or device stress checking methods. The users may thus implement custom stress criteria. These criteria for example may additionally require that the device be maintained in the stress condition for a device type specific minimum length of time before the device is considered adequately stressed.

Coverage Reports

At the end of the stress testbench simulation, plug-in 616 may generate a report in which the stressed device details (and their individual and accumulated areas and device types) may be provided. By collating and comparing a number of such reports from repeated stress tests, the plug-in may compare effective and gate oxide stress coverage of different testbenches and test vectors, to choose an optimal solution that stresses the most gate oxide area in the least amount of tester time or resource consumption.

Figure 9:
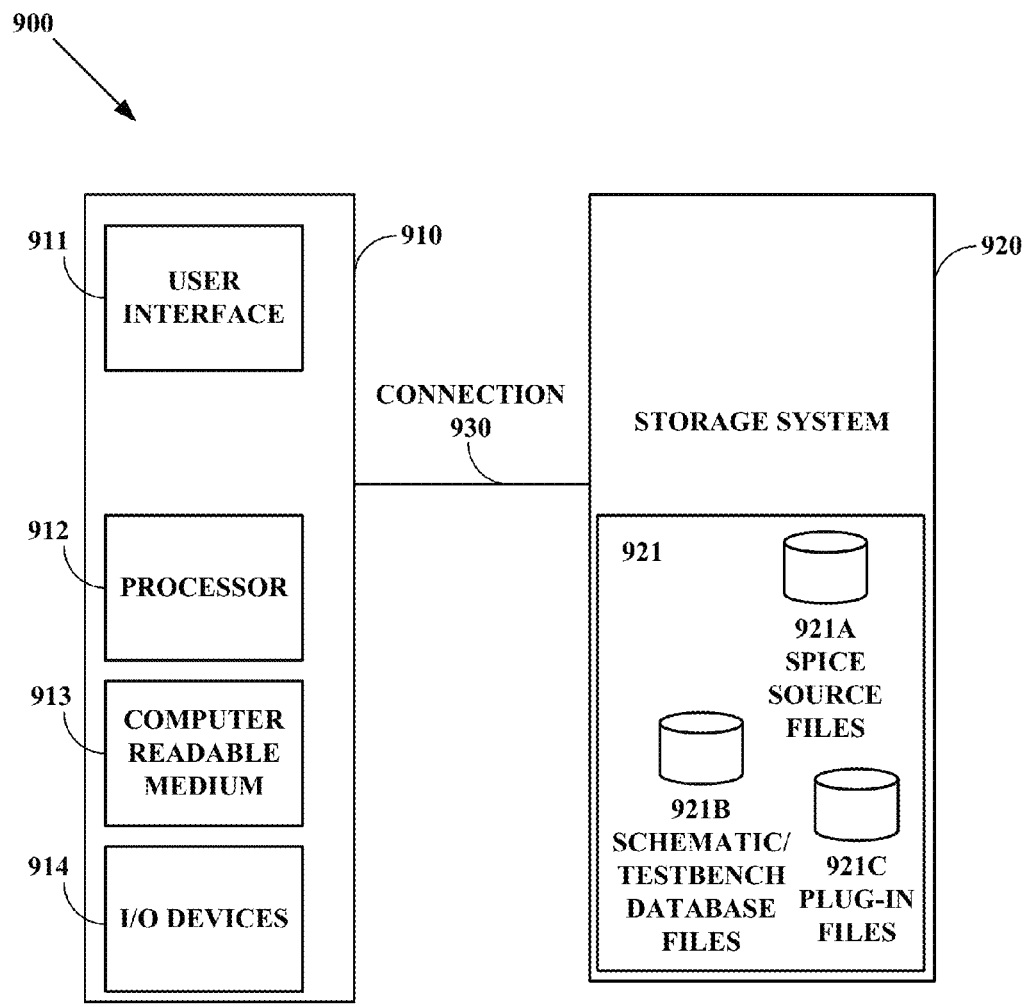
FIG. 9 is a block diagram of a circuit analysis system, according to an embodiment.

FIG. 9 shows a block diagram of an exemplary circuit analysis system 900, according to an embodiment. This system may provide simulator functionality for any of the methods described above. A user may access the system 900 through a standalone client system, client-server environment, or a network environment. System 900 may comprise one or more clients or servers 910, one or more storage systems 920, and a connection or connections 930 between and among these elements.

Client 910 may execute instructions stored on transitory or non-transitory computer readable medium 913 with processor 912, and may provide a user interface 911 to allow a user to access storage system 920. The instructions may be part of a software program or executable file that may operate electronic design automation (EDA) software. Client 910 may be any computing system, such as a personal computer, workstation, mobile computer, or other device employing a processor which is able to execute programming instructions. User interface 911 may be a GUI run in a user-controlled application window on a display. A user may interact with user interface 911 through one or more input/output (I/O) devices 914 such as a keyboard, a mouse, or a touch screen.

Storage system 920 may take any number of forms, including but not limited to a server with one or more storage devices attached to it, a storage area network, or one or a plurality of non-transitory computer readable media. Databases 921 may be stored in storage system 920 such that they may be persistent, retrieved, or edited by the user. Databases 921 may include SPICE source files 921A, schematic/testbench database files 921B, and plug-in files 921C for example. These databases may be kept as separate files or systems, or may be merged together in any appropriate combination.

Only one client 910 is shown connected to storage system 920 through connection 930, which may be a simple direct wired or wireless connection, a system bus, a network connection, or the like, to provide client 910 with access to storage system 920. In another aspect, connection 930 may enable multiple clients 910 to connect to storage system 920. The connection may be part of a local area network, a wide area network, or another type of network, again providing one or more clients with access to storage system 920. Depending on system administrator settings, client 910's access to system storage 920 or to other clients may be limited.

Figure 10:
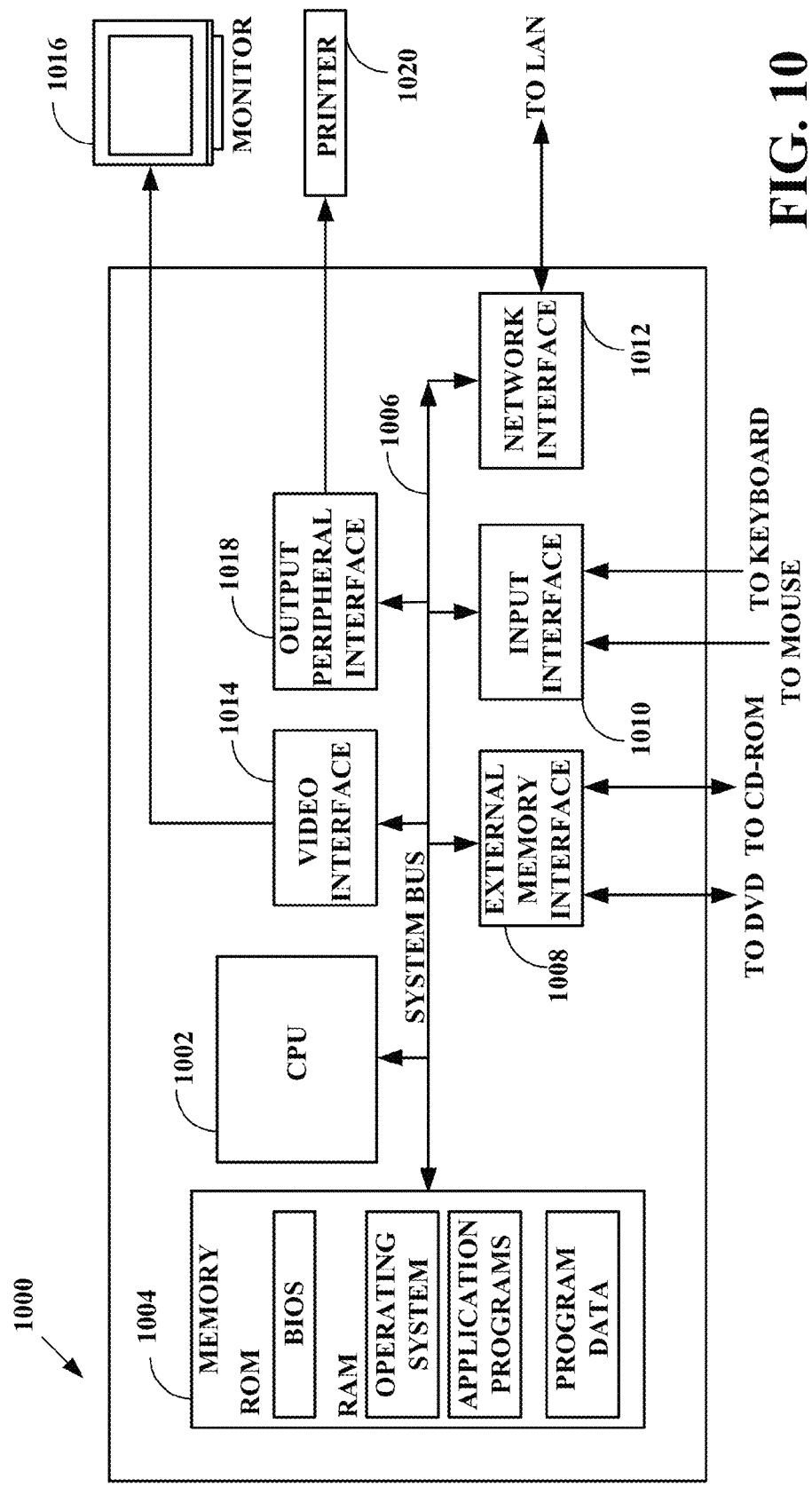
FIG. 10 is a diagram of a computer system, according to an embodiment.

FIG. 10 depicts a computer system comprising the structure for implementation of the embodiments described above. Computer system 1000 comprises a central processing unit (CPU) 1002 that processes data stored in memory 1004 exchanged via system bus 1006. Memory 1004 typically includes read-only memory, such as a built-in operating system, and random-access memory, which may include an operating system, application programs, and program data. Computer system 1000 also comprises an external memory interface 1008 to exchange data with a DVD or CD-ROM for example. Further, input interface 1010 may serve to receive input from user input devices including but not limited to a keyboard and a mouse. Network interface 1012 may allow external data exchange with a local area network (LAN) or other network, including the internet. Computer system 1000 also typically comprises a video interface 1014 for displaying information to a user via a monitor 1016. An output peripheral interface 1018 may output computational results and other information to output devices including but not limited to a printer 1020.

Computer system 1000 may comprise for example a personal computer or an engineering workstation, each of which is widely known in the art and is commonly used for integrated circuit design tasks, along with software products commercially available for performing computer-aided integrated circuit design tasks. Computer system 1000 may also comprise a mobile computer, including for example a tablet computer or a smart phone. The computer system of FIG. 10 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention will be apparent to ordinarily skilled artisans. The invention is limited only by the scope of the appended claims.

What is claimed is:

1. A computer-implemented method for improving circuit reliability in circuit design so as to facilitate provision of a manufacturable description of a circuit, the method comprising:
   inputting a test stimulus, a stress test criterion, and a circuit schematic, to a computer-implemented circuit simulator;
   using the circuit simulator, simulating the circuit schematic;
   during the simulating, determining whether at least one circuit component is stressed by exposure to simulated conditions meeting the stress test criterion;
   modifying at least one of the circuit schematic and the test stimulus to increase the percentage of stressed circuit components, wherein modifying the circuit schematic comprises at least one of selectively bypassing voltage regulators and adding test connections; and
   tangibly outputting simulation results, in order to provide the manufacturable description of the circuit.

2. The method of claim 1 wherein the circuit schematic describes analog integrated circuitry.

3. The method of claim 1 wherein the circuit schematic describes a number of MOS components comprising a gate oxide layer with an effective area determined by an effective width and an effective length, wherein component defect likelihood increases with effective area.

4. The method of claim 1 wherein the test stimulus and the stress test criterion each comprise at least one electrical stress condition for application to the circuit schematic to accelerate defective circuit component failure.

5. The method of claim 1 further comprising initially performing a reference simulation and storing selected results for stress test criterion evaluation.

6. The method of claim 1 wherein the determining comprises using a circuit simulator plug-in to monitor at least selected circuit components estimated to be most likely to be defective, without requiring storage of simulation output waveforms.

7. The method of claim 1 further comprising identifying and selecting candidate MOS components with relatively large gate oxide areas as targets for the determining.

8. A non-transitory computer readable medium storing instructions that, when executed by a processor, perform a method for improving circuit reliability in circuit design so as to facilitate provision of a manufacturable description of a circuit, the method comprising:
   inputting a test stimulus, a stress test criterion, and a circuit schematic, to a processor-implemented circuit simulator;
   using the circuit simulator, simulating the circuit schematic;
   during the simulating, determining whether at least one circuit component is stressed by exposure to simulated conditions meeting the stress test criterion;
   modifying at least one of the circuit schematic and the test stimulus to increase the percentage of stressed circuit components, wherein modifying the circuit schematic comprises at least one of selectively bypassing voltage regulators and adding test connections; and
   tangibly outputting simulation results, in order to provide the manufacturable description of the circuit.

9. The medium of claim 8 wherein the circuit schematic describes analog integrated circuitry.

10. The medium of claim 8 wherein the circuit schematic describes a number of MOS devices comprising a gate oxide layer with an effective area determined by an effective width and an effective length, wherein component defect likelihood increases with effective area.

11. The medium of claim 8 wherein the test stimulus and the stress test criterion each comprise at least one electrical stress condition for application to the circuit schematic to accelerate defective circuit component failure.

12. The medium of claim 8 further comprising initially performing a reference simulation and storing selected results for stress test criterion evaluation.

13. The medium of claim 8 wherein the determining comprises using a circuit simulator plug-in to monitor at least selected circuit components estimated to be most likely to be defective, without requiring storage of simulation output waveforms.

14. The medium of claim 8 further comprising identifying and selecting candidate MOS components with relatively large gate oxide areas as targets for the determining.

15. A system comprising:
   a non-transitory memory storing executable instructions; and
   a processor executing the instructions to perform a method for improving circuit reliability in circuit design so as to facilitate provision of a manufacturable description of a circuit, the method comprising:
   inputting a test stimulus, a stress test criterion, and a circuit schematic describing a circuit, to a processor-implemented circuit simulator;
   using the circuit simulator, simulating the circuit schematic;
   during the simulating, determining whether at least one circuit component is stressed by exposure to simulated conditions meeting the stress test criterion;
   modifying at least one of the circuit schematic and the test stimulus to increase the percentage of stressed circuit components, wherein modifying the circuit schematic comprises at least one of selectively bypassing voltage regulators and adding test connections; and
   tangibly outputting simulation results, in order to provide the manufacturable description of the circuit.

16. The system of claim 15 wherein the circuit schematic describes a number of MOS devices comprising a gate oxide layer with an effective area determined by an effective width and an effective length, wherein component defect likelihood increases with effective area.

17. The system of claim 15 wherein the test stimulus and the stress test criterion each comprise at least one electrical stress condition for application to the circuit schematic to accelerate defective circuit component failure.

18. The system of claim 15 further comprising initially performing a reference simulation and storing selected results for stress test criterion evaluation.

19. The system of claim 15 wherein the determining comprises using a circuit simulator plug-in to monitor at least selected circuit components estimated to be most likely to be defective, without requiring storage of simulation output waveforms.

20. The system of claim 15 further comprising identifying and selecting candidate MOS components with relatively large gate oxide areas as targets for the determining.

* * * * *